United States Patent
Wharton

(10) Patent No.: US 11,435,649 B2
(45) Date of Patent: Sep. 6, 2022

(54) APPARATUS AND METHOD FOR CALIBRATING AN AERIAL MOVEMENT SYSTEM

(75) Inventor: Stephen Wharton, Claremore, OK (US)

(73) Assignee: CABLECAM, LLC, Fort Worth, TX (US)

( * ) Notice: Subject to any disclaimer, the term of this patent is extended or adjusted under 35 U.S.C. 154(b) by 82 days.

(21) Appl. No.: 12/974,733

(22) Filed: Dec. 21, 2010

(65) Prior Publication Data

US 2011/0204197 A1    Aug. 25, 2011

Related U.S. Application Data

(60) Provisional application No. 61/289,832, filed on Dec. 23, 2009.

(51) Int. Cl.

| | |
|---|---|
| G03B 15/00 | (2021.01) |
| H04N 5/225 | (2006.01) |
| G03B 17/56 | (2021.01) |
| B61B 7/04 | (2006.01) |
| F16M 11/42 | (2006.01) |
| F16M 11/18 | (2006.01) |
| B66C 13/08 | (2006.01) |
| B66C 21/00 | (2006.01) |
| B25J 9/00 | (2006.01) |
| F16M 11/04 | (2006.01) |

(52) U.S. Cl.
CPC .............. *G03B 15/00* (2013.01); *B61B 7/04* (2013.01); *G03B 17/561* (2013.01); *H04N 5/225* (2013.01); *B25J 9/0078* (2013.01); *B66C 13/08* (2013.01); *B66C 21/00* (2013.01); *F16M 11/043* (2013.01); *F16M 11/18* (2013.01); *F16M 11/425* (2013.01)

(58) Field of Classification Search
CPC ........ B66C 13/08; B66C 21/00; B25J 9/0078; G03B 15/00; G03B 17/561; B61B 7/04; F16M 11/043; F16M 11/18; F16M 11/425; H04N 5/225
USPC ....... 73/1.79; 104/173.1, 178, 179; 248/317, 248/323; 348/144, 157
See application file for complete search history.

(56) References Cited

U.S. PATENT DOCUMENTS

| | | |
|---|---|---|
| 2,633,054 A | 1/1947 | Black |
| 2,538,910 A | 4/1947 | Miller |
| 3,324,239 A | 6/1967 | Jacobson |
| 3,437,748 A | 4/1969 | Latady et al. |
| 3,935,380 A | 1/1976 | Coutta |
| 4,027,329 A | 5/1977 | Coutta |
| 4,625,938 A * | 12/1986 | Brown .......................... 248/550 |

(Continued)

FOREIGN PATENT DOCUMENTS

GB    2133158 A1    7/1984

OTHER PUBLICATIONS

International Search Report, International Application No. PCT/US10/61557, dated Mar. 1, 2011.

*Primary Examiner* — Zachary L Kuhfuss

(74) *Attorney, Agent, or Firm* — Schroeder Intellectual Property Law Group, LLC

(57) ABSTRACT

An aerial movement system and method for calibrating same includes, generally, registration points and wireless position transceivers proximate the registration points and the object that communicate with a computer and allow for the computer to determine the appropriate amount of support lines to draw in or release.

1 Claim, 2 Drawing Sheets

(56) References Cited

U.S. PATENT DOCUMENTS

| | | |
|---|---|---|
| 4,710,819 A | 12/1987 | Brown |
| 4,873,571 A | 10/1989 | Balet et al. |
| 5,080,302 A | 1/1992 | Hoke |
| 5,224,426 A | 7/1993 | Rodnunsky et al. |
| 5,440,476 A | 8/1995 | Lefkowitz et al. |
| 5,568,189 A | 10/1996 | Kneller |
| 5,585,707 A | 12/1996 | Thompson et al. |
| 6,160,371 A * | 12/2000 | Tachikawa ............... 318/568.11 |
| 6,566,834 B1 | 5/2003 | Albus et al. |
| 6,809,495 B2 | 10/2004 | Rodnunsky |
| 6,873,355 B1 | 3/2005 | Thompson et al. |
| 6,886,471 B2 | 5/2005 | Rodnunsky |
| 6,975,089 B2 | 12/2005 | Rodnunsky et al. |
| 7,036,436 B2 | 5/2006 | MacDonald et al. |
| 7,088,071 B2 | 8/2006 | Rodnunsky |
| 7,127,998 B2 | 10/2006 | MacDonald et al. |
| 7,207,277 B2 | 4/2007 | Rodnunsky |
| 7,239,106 B2 | 7/2007 | Rodnunsky et al. |
| 7,948,431 B2 * | 5/2011 | Gulden et al. .................. 342/42 |
| 8,199,197 B2 * | 6/2012 | Bennett et al. ............... 348/144 |
| 8,251,597 B2 | 8/2012 | Dougherty et al. |
| 8,402,898 B2 | 3/2013 | Rodnunsky |
| 9,063,390 B2 | 6/2015 | Wharton |
| 9,477,141 B2 * | 10/2016 | Wharton ................. H04N 5/232 |
| 9,964,836 B2 | 5/2018 | Bennett et al. |
| 10,099,368 B2 * | 10/2018 | DelSpina ................. B25J 9/161 |
| 10,103,813 B2 * | 10/2018 | Wharton ............... F16M 11/425 |
| 10,471,590 B1 * | 11/2019 | Vachon ................. B25J 9/1623 |
| 2005/0242052 A1 | 11/2005 | O'Conner et al. |
| 2007/0064208 A1 * | 3/2007 | Giegerich ............ F16M 11/046 353/122 |
| 2009/0066100 A1 * | 3/2009 | Bosscher et al. ............. 294/86.4 |
| 2009/0207250 A1 * | 8/2009 | Bennett .............. F16M 11/2064 348/144 |
| 2011/0204196 A1 * | 8/2011 | Wharton ................. G03B 15/00 248/323 |
| 2012/0211628 A1 * | 8/2012 | Fisher .................... F16M 11/12 248/329 |
| 2012/0298825 A1 * | 11/2012 | Fisher ........................... 248/323 |
| 2013/0050467 A1 * | 2/2013 | Wharton ......................... 348/86 |
| 2013/0050652 A1 * | 2/2013 | Wharton ......................... 352/34 |
| 2013/0051805 A1 * | 2/2013 | Wharton ......................... 398/96 |

* cited by examiner

APPARATUS AND METHOD FOR CALIBRATING AN AERIAL MOVEMENT SYSTEM

RELATED APPLICATIONS

This application claims priority to U.S. Provisional Application No. 61/289,832 filed on Dec. 23, 2009, the entirety of which is hereby incorporated by reference.

TECHNICAL FIELD

The present invention relates, in general, to a device and method for calibrating an aerial movement system, and in particular an aerial movement system that is suspending a camera.

BACKGROUND

Aerial movement systems are useful in moving, for example, a camera over a large expanse such as a football field, or basketball court. While the remaining description generally discusses these aerial movement systems as they relate to cameras, it should be appreciated and understood that the present invention is not necessarily limited only to aerial movement systems with a camera.

In an aerial movement system, the suspended camera is typically controlled by an operator who utilizes a joy stick (or other similar controls) to position the camera around the expanse that the camera is suspended over. Through a computer, the joy stick communicates with motors and associated reels that release or draw in cable coupled to the camera. Thus, as the operator moves the joy stick, the computer communicates with the various motors and reels to release and/or draw in the appropriate amount of support lines and ultimately move the camera.

Unlike normal cameras, the camera operator for a camera suspended in an areal movement system is typically located a distance away from the camera. Moreover, the camera is typically controlled through the use of a computer. Accordingly, it is important that the camera and associated equipment be calibrated accurately to provide precise data to the system for movement of the camera.

Current methods of calibrating aerial movements systems with cameras can be very time consuming and expensive, and they can be impractical for very large expanses and/or uses.

For example, in order to calibrate a four point aerial movement system, such as that disclosed in U.S. Pat. No. 6,873,355, typically, a triangle is created on the ground between the support towers. The support lines from each reel are pulled out, by hand, to each corner on the triangle. The length of support line is measured via a counter on the reel. All of the measurements are then entered into the computer that is used to control the movement of the camera.

This type of calibration method is very time consuming, as it relies upon people to walk and pull the support lines. In addition, it requires use of the ground below the expanse. This may be problematic, for example, if the ground is a football field and workers are painting lines or re-sodding or if an athletic team is practicing before a contest. Furthermore, given the method, inaccurate data may be provided given the catenary associated with support lines. Moreover, given the fact that this method requires people, it can be expensive as it can require at least three people and an entire day simply to calibrate the system. This cost can be extremely large—especially if the system is constantly being deployed in a different location every week.

Other methods of calibrating such systems include using laser measuring devices and reflective surfaces. However, these types of methods similarly may require people to collect the data, and they similarly require use of the ground under the expanse. Furthermore, if the expanse is large, it may be difficult to use such measuring devices as a pointing a laser measuring tool over a long distance to a small reflective surface could prove to be difficult, as well as time consuming.

Therefore, the need exists for a calibration method and system that allows for a relatively quick and reliable calibration for an aerial movement system.

In addition, it would be beneficial if the calibration method and system was relatively inexpensive and did not require use of the ground or area below the expanse in which the aerial movement system is deployed.

BRIEF SUMMARY OF THE INVENTION

The present invention is directed towards an aerial movement system that, generally, utilizes wireless position transceivers on the object and at various registration points to calibrate an aerial movement system.

In one embodiment of the invention, the invention includes an object to be suspended over an expanse and a plurality of reels disposed around the expanse. Each reel includes a support line coupled to the object. In addition, each reel from the plurality of reels is associated with a registration point. A computer is in communication with each of the reels. A first and second wireless position transceiver are disposed proximate a first and a second registration point. A third wireless position transceiver is disposed proximate the object. Finally, each wireless position transceiver is in communication with the computer.

In another embodiment of the invention, the invention is a method that includes the steps of disposing a plurality of reels around an expanse, wherein each reel includes a support line and a registration point; coupling the support lines to an object to be suspended over the expanse; associating a first wireless position transceiver with the object; associating a second wireless position transceiver with the registration point of a first reel; associating a third wireless position transceiver with the registration point of a second reel; and suspending the object above the expanse.

By utilizing wireless position transceivers, the calibration of the system may be accomplished through a computer. Moreover, by utilizing wireless position transceivers, the set up of the aerial movement system would also include setting up the calibration system, since the wireless position transceivers would be deployed along with the normal equipment associated with the set up of the aerial movement system. Accordingly, this should decrease the costs associated with setting up such a system by eliminating (or at least minimizing) the need for people to walk around and calibrate each support line by hand.

Further, such a system and method should not require any additional use of the ground below the expanse other than the time that is normally required to deploy (without calibrating) an aerial movement system. This should minimize the time needed to use the ground below the expanse to set up and calibrate the aerial movement system. In addition, this should minimize any scheduling conflicts associated with the calibration of the aerial movement system.

Moreover, a system and method such as those disclosed and described herein should also provide more accurate data than the current calibration methods, as catenary and human error could be eliminated (or at least minimized) and the wireless transceivers would provide data that is more accurate and allow for more precise control of the object being moved through the aerial movement system.

Other benefits of the present invention will become readily apparent to those of ordinary skill in the art with this disclosure and the attached drawings before them.

BRIEF DESCRIPTION OF THE DRAWINGS

The present invention will become more fully apparent from the following description and appended claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings as provided below.

DETAILED DESCRIPTION

Figure 1:
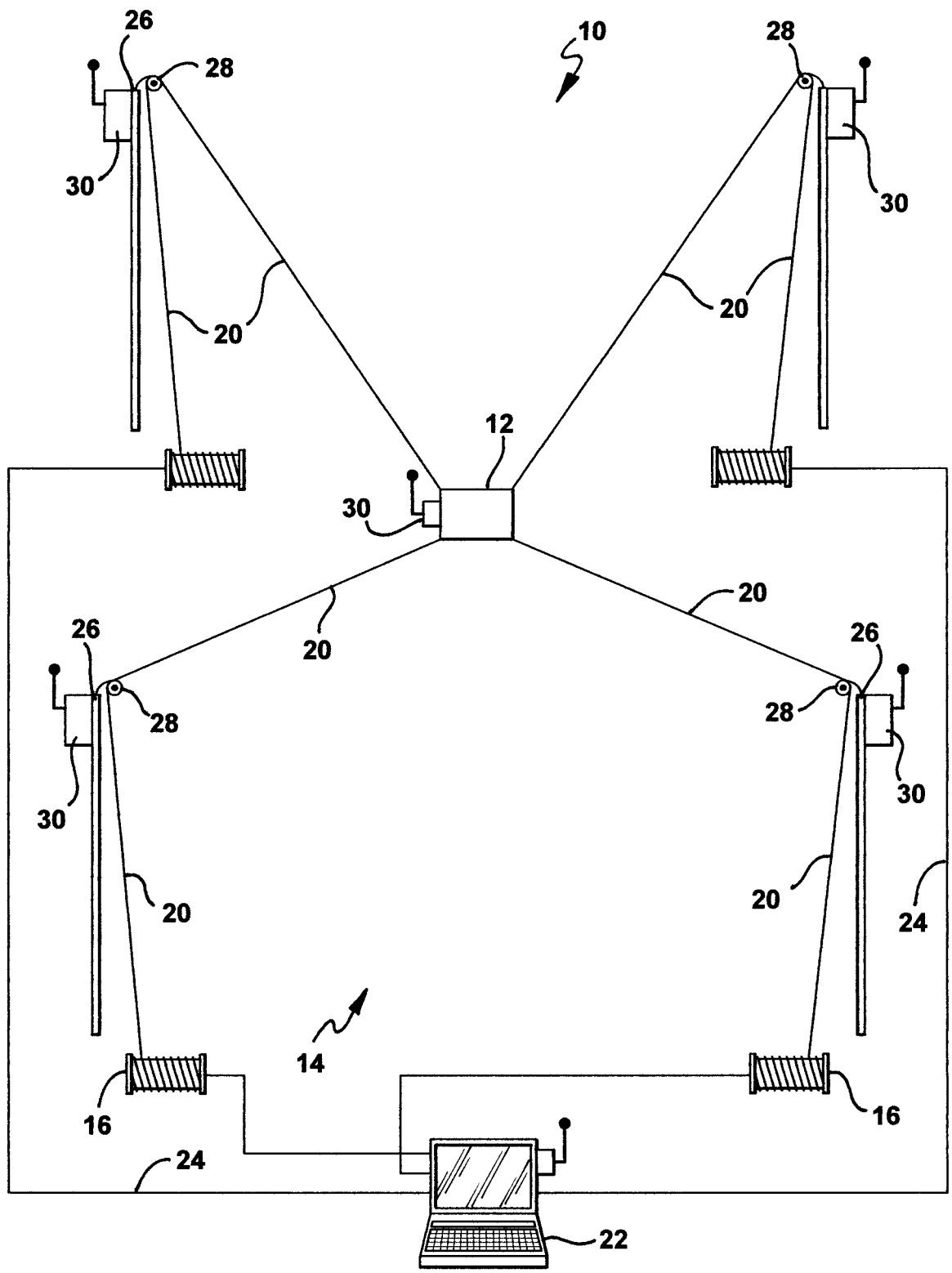
FIG. 1 is a schematic illustration of an embodiment of an aerial movement system according to the present invention.
Figure 2:
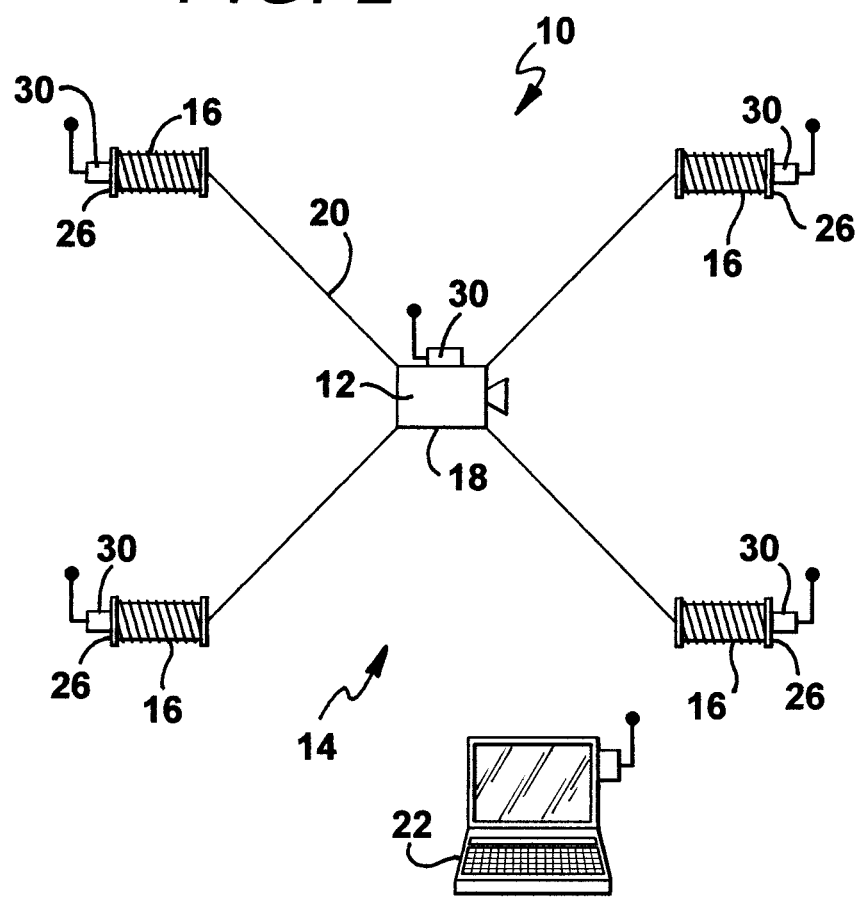
FIG. 2 is a schematic illustration of another embodiment of an aerial movement system according to the present invention.

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

In an embodiment of the invention, an aerial movement system 10 includes an object 12 to be suspended over an expanse 14. A plurality of reels 16 is disposed around the expanse 14. In a preferred embodiment, the object 12 is a camera 18, and the expanse 14 is a sporting surface (e.g., football field, basketball court, race track, etc.).

Each reel 16 includes a support line 20 being coupled to the object 12. The support line 20 may or may not be able to transmit data from the object 12 (such as a video feed from a camera 18, or data from a probe). The reels 16 are in communication with a computer 22. The reels 16 may be in wireless communication with the computer 22, or alternatively, the reels 16 may be in communication with the computer 22 through wires 24.

In addition, each reel 16 is associated with a registration point 26. As used herein, a reel 16 is associated with a registration point 26 by including a registration point 26 at some set position along the path of (but not necessarily on) the support line 20 between the reel 16 and the object 12. Thus, for example, in some embodiments of aerial movement devices 10 a sheave 28 is used to redirect the support lines 20. In such an embodiments, the registration point 16 may be on or adjacent the sheave 28. In other embodiments, no sheave 28 is needed, as the reels 16 are disposed, for example, in the rafters above the expanse 14. In such an embodiment, the registration point 26 may be disposed on or adjacent the reel 16.

Disposed at each of the registration point 26 is a wireless position transceiver 30. An additional wireless position transceiver 30 is located on the object 12. The wireless position transceivers 30 are in wireless communication with the computer 22. The wireless position transceivers 30 may be, for example, GPS transceivers, or LPM (Local Positioning Measurement) transceivers. It is contemplated that the transceivers maybe GPS RTK, GPS WAAS, AGPS (Assisted GPS), LAAS (Local Area Augmentation System), GBAS (Ground Based Augmentation System), DGPS (Differential GPS)transceivers, or any other similar type of technology. These types of transceivers provide very accurate positioning locations, and thus would be beneficial to use in such a system. An additional benefit associated with the use of LPM transceivers is that they may provide real time "closed loop" monitoring of the object 12 and reels 16, which allows for greater safety and control, as well as the ability to control, record and program movement of the object 12 and knowing its precise position. It will be appreciated that the transceiver can be comprised of a separate receiver and transmitter, or other similar components.

In use, the wireless position transceivers 30 disposed at registration points 26 communicate their respective positions to the computer 22. At the same time, the wireless position transceiver 30 on the object 12 will also communicate its position to the computer 22. The position of the object 12 in relation to the registration points 26 associated with the reel 16 may then be used to calibrate the aerial movement system 10, and provide an accurate location of the object 12. This position, in turn, will be able to be utilized by the computer 22 to calculate the appropriate amount of support lines 20 to release and/or draw in from the reels 16 to move the object 12 to the desired location.

In another embodiment of the invention, the invention is a method of calibrating an aerial movement system comprising the steps of: disposing a plurality of reels around an expanse, wherein each reel includes a support line and a registration point; coupling the support lines to an object to be suspended over the expanse; associating a first wireless position transceiver with the object; associating a second wireless position transceiver with the registration point of a first reel; associating a third wireless position transceiver with the registration point of a second reel; and suspending the object above the expanse.

The method may also include the step of determining a position of the object and even further include the step of determining the position of the object in relation to the registration points of the first reel and the second reel.

A method according to the present invention may also include the step of communicating between a computer and each of the first, the second and the third wireless position transceivers.

Further, a method according to the present invention may also include the step of moving the object throughout the expanse.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure provided herein. In other words, various modifications and improvements of the embodiments specifically disclosed in the description above are within the scope of the appended claims. Note that elements recited in means-plus-function format are intended to be construed in accordance with 35 U.S.C. § 112 ¶6. The scope of the invention is therefore defined by the following claims.

What is claimed is:

1. A method of moving a camera over an expanse comprising the steps of:

deploying a plurality of reels around a first expanse, each reel including a support line;

fixing a first wireless position transceiver when deploying a first reel, the first position transceiver being deployed in a first set position around the first expanse;

fixing a second wireless position transceiver when deploying a second reel, the second position transceiver being deployed in a second set position around the first expanse;

coupling the support lines to a camera to be suspended over the expanse;

associating a third wireless position transceiver with the camera;

suspending the camera above the expanse using the support lines;

transmitting a position of the first wireless position transceiver to the computer;

transmitting a position of the second wireless position transceiver to the computer;

transmitting a position of the third wireless transceiver to the computer;

recording the movement of the camera to selected, known locations over the expanse using the computer and the first, second and third wireless transceivers;

monitoring the reels using the computer as the camera is moved to the selected, known locations;

calibrating the movement of the camera over the entire expanse based upon recorded movement of the camera; and controlling each reel to release and/or draw in each reel's respective support line using the computer in order to move the camera to any desired location over the expanse, the computer controlling an amount each reel releases and/or draws in each reel's respective support line using calculated amounts based calibrated movement of the camera and the positions received from the third wireless position transceiver over the expanse relative to the first and second wireless position transceiver, wherein each of the aforementioned steps are repeated at a second expanse.

* * * * *